Figure 1:
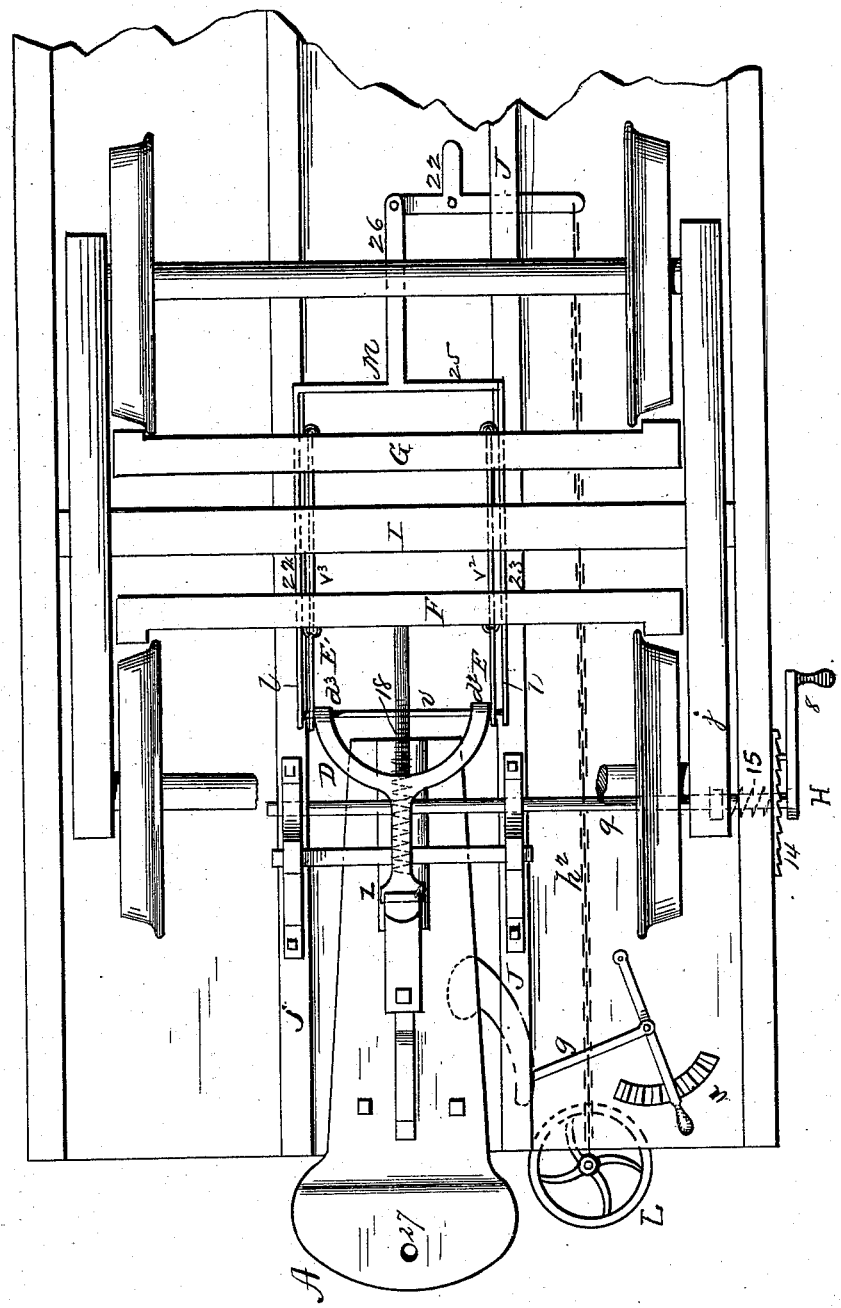

(No Model.)　　　　　　　N. O. SWENSON.　　　　5 Sheets—Sheet 1.

CAR BRAKE AND COUPLING.

No. 258,264.　　　　　　　　　　　　Patented May 23, 1882.

WITNESSES　　　　　　　　　　　　　　　　　INVENTOR

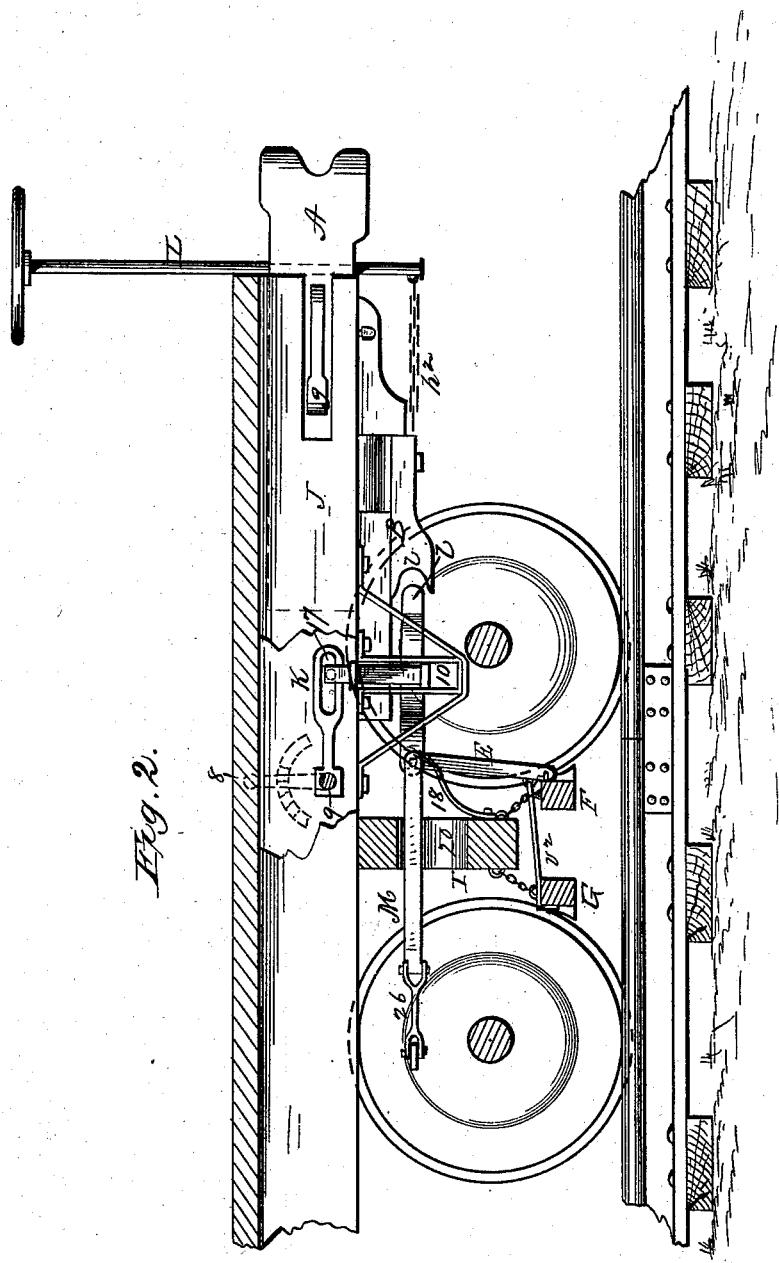

(No Model.)
N. O. SWENSON.
CAR BRAKE AND COUPLING.
No. 258,264.  Patented May 23, 1882.
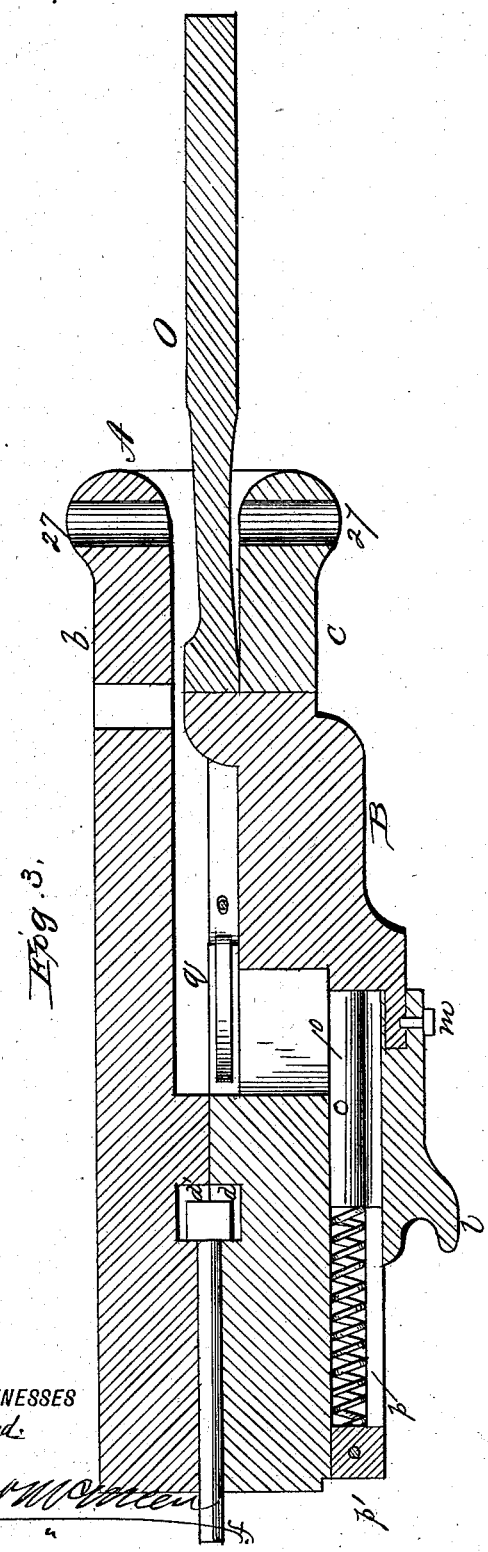
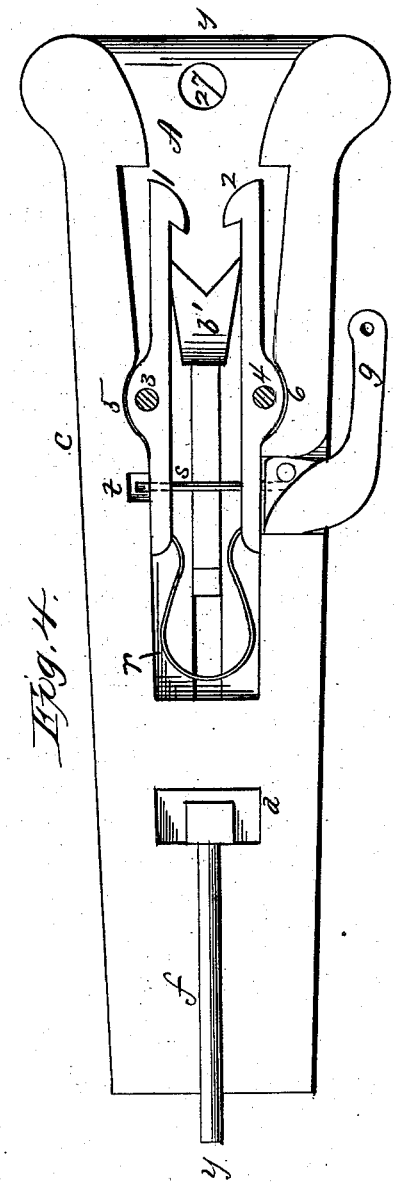

(No Model.) 5 Sheets—Sheet 4.
N. O. SWENSON.
CAR BRAKE AND COUPLING.
No. 258,264. Patented May 23, 1882.
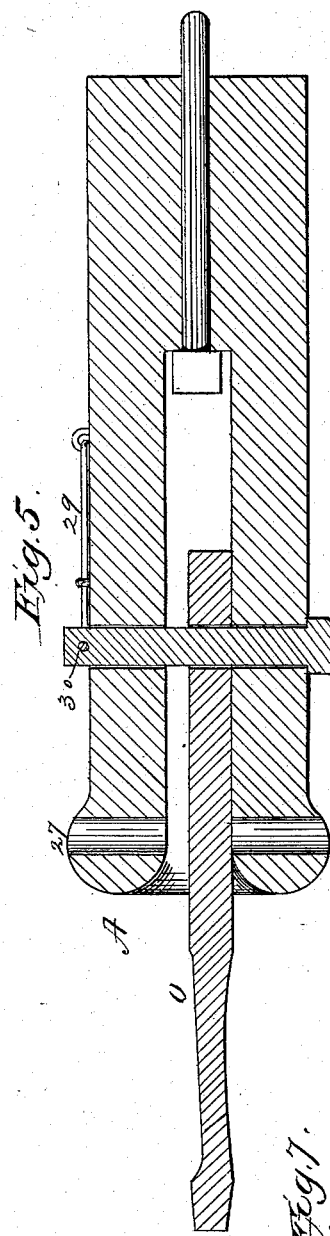
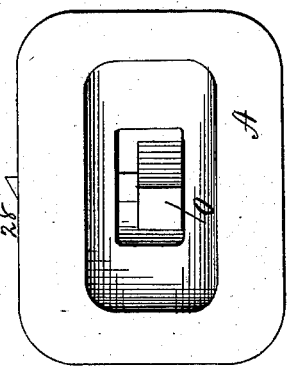
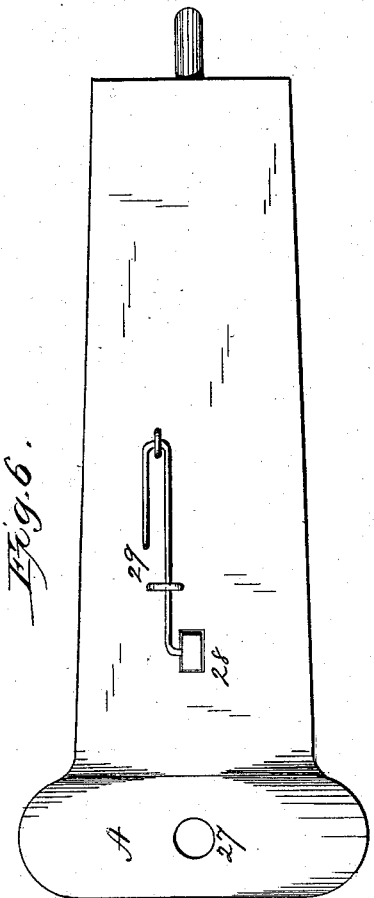
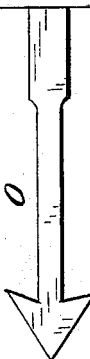
WITNESSES
INVENTOR
Nils O. Swenson
by W. B. Doolittle
Attorney

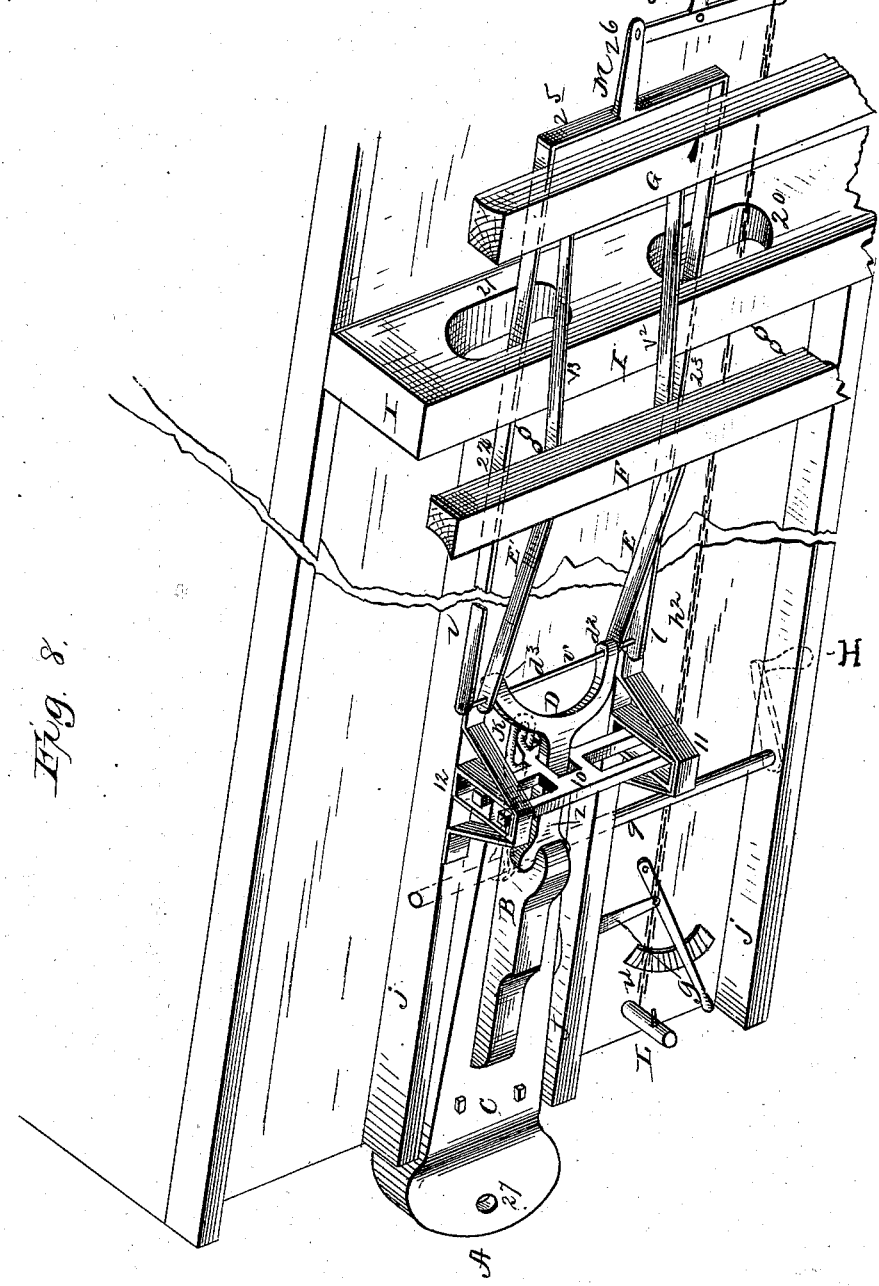

UNITED STATES PATENT OFFICE.

NILS OLOF SWENSON, OF TERRAVILLE, DAKOTA TERRITORY.

CAR BRAKE AND COUPLING.

SPECIFICATION forming part of Letters Patent No. 258,264, dated May 23, 1882.

Application filed March 9, 1882. (No model.)

*To all whom it may concern:*

Be it known that I, NILS OLOF SWENSON, a citizen of the United States, residing at Terraville, in the county of Lawrence and Territory of Dakota, have invented certain new and useful Improvements in Automatic Car Brake and Coupling; and I do hereby declare the following to be a full, clear, and exact description of the invention, such as will enable others skilled in the art to which it appertains to make and use the same.

The object of my invention is the construction and arrangement of an automatic car brake and coupling mechanism operated from within the draw-head, by which all or part or any one of the cars can be coupled and the brakes applied separately by the backward motion of the locomotive.

It consists in the combination of a buffer or draw-head, coupling mechanism, spring push-arm, levers, rods, brake-beams, and independent improvements on some of these parts, as more particularly hereinafter set forth, and illustrated in the accompanying drawings, in which—

Figure 1 is a plan view of a truck with my improvements attached; Fig. 2, a side elevation in section, showing more particularly the braking mechanism; Fig. 3, a sectional view of buffer, showing spring push-arm and coupling mechanism, and Fig. 4 a plan view of the same; Fig. 5, a sectional view of bumper, showing means of connection therewith of a link for operating the brake and for reversing said link when cars are not to be coupled automatically; Fig. 6, a plan view, and Fig. 7 an end view, of the same; Fig. 8, a side elevation of the bottom of the car, showing the push-arm and its connections.

The same letters represent similar parts throughout the several views.

A represents a draw-head of the ordinary bell-shaped configuration, and provided at its rear end with the usual bolt and spiral spring to resist shocks. In mode of construction, however, this draw-head differs from others in being formed of two plates—an upper and a lower one, $b$ and $c$, joined by bolts. Within the lower plate, $c$, as shown in Fig. 4, are secured two spring coupling-hooks, 1 and 2, a lever, $g$, for withdrawing said hooks from each other, and the rear buffing-bolt, $f$, which rests in a groove, and the head of which is confined in a recess, $d$.

B is a push-arm located between the coupling-hooks, extending upward through a slot in the bed-plate $c$, and provided with a forked head, $b'$, sliding between and projecting above the hooks 1 and 2. On the under side of plate $c$ may be seen the opposite forked end, $l$, of push-arm B, made in a separate piece and connected to the forward part of B by screw-pin $m$. Part $l$ is provided with flange and rounded projection $o$, constructed to slide in slotted box $p$ and against a spiral spring contained therein, and which box is cast to the under side of plate $c$. At the end of box $p$ is a plug, $p'$, held therein by a pin, against which the spring abuts, and which plug can be easily removed to repair the spring, to put in a new one, and to also permit the part $l$ of push-arm B to be slid out or put in through the box, when desired, for repair or replacement by a new one, without taking apart the draw-head or removing other parts. The under side of upper plate, $b$, is furnished with a guideway, $q$, for the upper projecting head, $b'$, of push-arm B, and also with a recess, $d'$, to correspond with recess $d$, for the reception and retention of the spring-bolt $f$.

The hooks 1 and 2 are held in the lower plate, $c$, by means of pins 3 4, passing through upper plate, through curved portions of the hooks, resting in corresponding recesses, 5 and 6, and through the lower plate. These pins act as fulcrums for the hooks 1 and 2. The rear ends of the hooks are connected by a curved steel spring, $r$, the action of which serves to keep them in engagement with an arrow-headed coupling-link. The rear ends of said hooks are also arranged to approach each other by sliding on rod S, passing through slots in the hooks, one end of which is fastened by means of a pin passing through an eye in the rod, as at $t$, and the other end of rod passing into a slot of lever $g$, and there held by an eye and pin in such position that on turning lever $g$ backward the hooks 1 and 2 are disengaged from the coupling-link, and can be so held that the cars need not be coupled, if so desired, by fixing the handle of lever $g$ into the rack-bar, $u$, as shown in Fig. 1.

D is a lever, having forked arms $d^2$ $d^3$ pivoted or otherwise secured to swinging rod $v$. The said lever D, just back of its curved arms, passes through a movable frame, 10, which is raised and lowered within boxes 11 and 12 (shown in Fig. 8) by lever H.

Attached to rod $v$ are arms E and E', which are pivoted at their lower ends to brake-beam F, suspended by chains from the cross-piece I. The front brake-beam, F, and the rear brake-beam, G, (also suspended by chains from the cross-piece I,) are connected by rods or arms $v^2$ and $v^3$ by a link attachment, as shown in Figs. 1 and 2.

When in position for braking, the end $z$ of lever D rests within the forked end $l$ of the push-arm B, so as to be acted upon by the push-arm when pressure is applied thereto by entrance of a link within the draw-head and against the head $b'$ of the push-arm; but when it is desired not to brake the cars the end $z$ of lever D is dropped below the forked end $l$ of the push-arm by lowering the frame 10 by means of lever H. This lever H consists of handle 8, rod 9, secured loosely in bearings in strips $jj$ and extending across the bottom of the car under the lever D, and slotted rod $k$, to which frame 10 is hinged, as shown in Figs. 1 and 8. The handle of said lever H is provided with a pin or catch to hold the lever in rack 14. Under one of the side strips, $j$, and held on the rod 9 by a collar, is a spiral spring, 15, which operates to throw the lever down when released from the rack 14. The slotted end of rod $k$ is connected to the frame 10 by a loosely-moving strap, 17, so that when the end $z$ of forked lever D is raised and lowered by lever H the said strap will slide backward and forward in the slot sufficiently to permit the raising and lowering of the frame 10 without cramping or jamming any of the parts.

18 is a spring, (shown in Figs. 1 and 2,) secured at its lower end to cross-piece I and at its upper end to the center of the lever D, between its forked arms, which serves, when the pressure upon the brakes is removed, to release them from the wheels and to throw the lever D forward again to engage with the forked end $l$ of the push-arm.

L is an ordinary form of chain-brake, the chain $h^2$ of which runs back under the car, over the brake-beams, through aperture 20 in cross-piece I, and is connected to arm 22 of lever M. Lever M consists of two rods or arms, 23 24, secured to the outer ends of rod $v$ of lever D, and running back through holes 20 and 21 in center piece, I, there connected by cross-rod 25, from the center of which extends arm 26, pivoted to arm 22. By these means a car can be braked without coupling, or after it is uncoupled, as when a car is separated from the rest of the cars and pushed backward or onto a siding.

Instead of using a double set of rods, as shown, a single rod may be employed running from the center of forked lever D to the center of both brake-beams.

O is a link, open, and with an arrow-head at one end, the head of which fits snugly into the forks of the head $b'$ of the push-arm. It may be here stated that the object of having said head $b'$ project above the surface of the under plate and of the hooks, &c., and guided in the groove in the plate above, is to keep it steady and to prevent cramping and catching against the hooks in turning short curves.

When the ends of both cars are provided with the hook mechanism a link with arrow-heads at both ends may be employed; but when it is desired to use my improvements in connection with an ordinary coupling-pin, or with an ordinary form of car, one or both ends of which are not provided with the hooking mechanism, I make the link O with one end closed in the usual manner. The draw-heads are provided with holes 27, by which to use the common form of coupling-pin with the closed link. The pin and closed link are also used when it is not desired to brake the cars.

When it is desired to use the arrow-head of open link the other end of the link is securely confined in one of the draw-heads by means of a bolt or pin, 28, and a spring-catch, 29, as shown in Figs. 5 and 6. Pin 28 has one side of its lower end beveled, as shown in Fig. 7, and when slid upward from the under side of the car through the hole in the draw-head it comes in contact with the end of the spring-catch 29, which passes into hole 30 in the end of the pin, and thus holds it in place. The spring-catch is secured to the top of the draw-head by screw-staples, as shown in Fig. 6.

The operation of the brake-lever mechanism is as follows: By the backward action of the locomotive pressure is applied through the link to push-arm B, which is forced back against brake-lever D. Pressure is communicated to the rods extending down to front brake-beam, and from said rods to the rear brake-beam, the action of the said lever and rods being to draw the front brake-beam, F, forward against the wheels and push the rear brake-beam backward against the wheels. This whole arrangement is shown applied to freight-cars; but the coupling and braking mechanisms can be applied equally as well to passenger-cars. In such case, however, the levers for withdrawing the coupling-hooks from each other and for throwing the brake-lever in and out of connection with the push-arm are by a different arrangement (not here shown) brought forward and operated from the platform.

It is also evident, as already shown, that my arrangement does not prevent the use of the common form of closed link and pin in coupling with cars which are not provided with my automatic coupling and braking mechanisms.

It will be seen, too, that in my structure all the parts are simple, easily accessible, and can be quickly taken apart for repair and replacement by new parts without disturbing the others.

A number of the parts shown can be changed in form and operation without departing from the principle of my invention. For instance, other forms of springs can be used for operating the coupling-hooks within the draw-head than the curved spring shown, and the form of levers and their connections for throwing in and out of operation the coupling and braking mechanisms may be varied.

Having thus described by invention, what I claim, and desire to secure by Letters Patent, is—

1. The combination of the automatic coupling mechanism, consisting of the spring-hooks pivoted within the draw-head, and the push-arm of an automatic braking mechanism provided with a head sliding between the coupling-hooks within the draw-head, substantially as described.

2. The braking mechanism consisting of the push-arm B, provided with projecting head $b'$, and the forked end $l$, and controlled by action of a spring, in combination with the braking-lever D, brake-beams, and their connecting arms or rods, substantially as described.

3. The spring coupling-hooks 1 and 2, pivoted, as described, within the draw-head between the plates $b\ c$, in combination with said plates, the rod S, on which the rear ends of said hooks slide, the lever $g$, and rack-bar $u$, substantially as set forth.

4. The push-arm B, consisting of the two separable parts, the head $b'$, extending above the surface of the hooks, within the draw-head, and through and below the draw-head, and the forked part $l$, having rounded portion $o$, substantially as described.

5. The swinging forked brake-lever D, in combination with frame and hand-lever, whereby to lower and raise the same, and the rods and brake-beams, substantially as described.

6. The combination, with the draw-head, of spring-catch 29, attached to the top of said draw-head, and the beveled pin 28, provided with a hole to receive the said catch for the purpose of securing the link within the draw-head, substantially as described.

7. In combination with the draw-head, the box $p$, provided with a plug, $p'$, to contain a spring and afford a support for the piece $l$ of push-arm B, substantially as described.

In testimony whereof I affix my signature in presence of two witnesses.

NILS OLOF SWENSON.

Witnesses:
JNO. R. YOUNG,
JAMES A. RUTHERFORD.